(No Model.)
E. DANIELSON.
REGULATING SPEED OF INDUCTION MOTORS.
No. 584,577. Patented June 15, 1897.
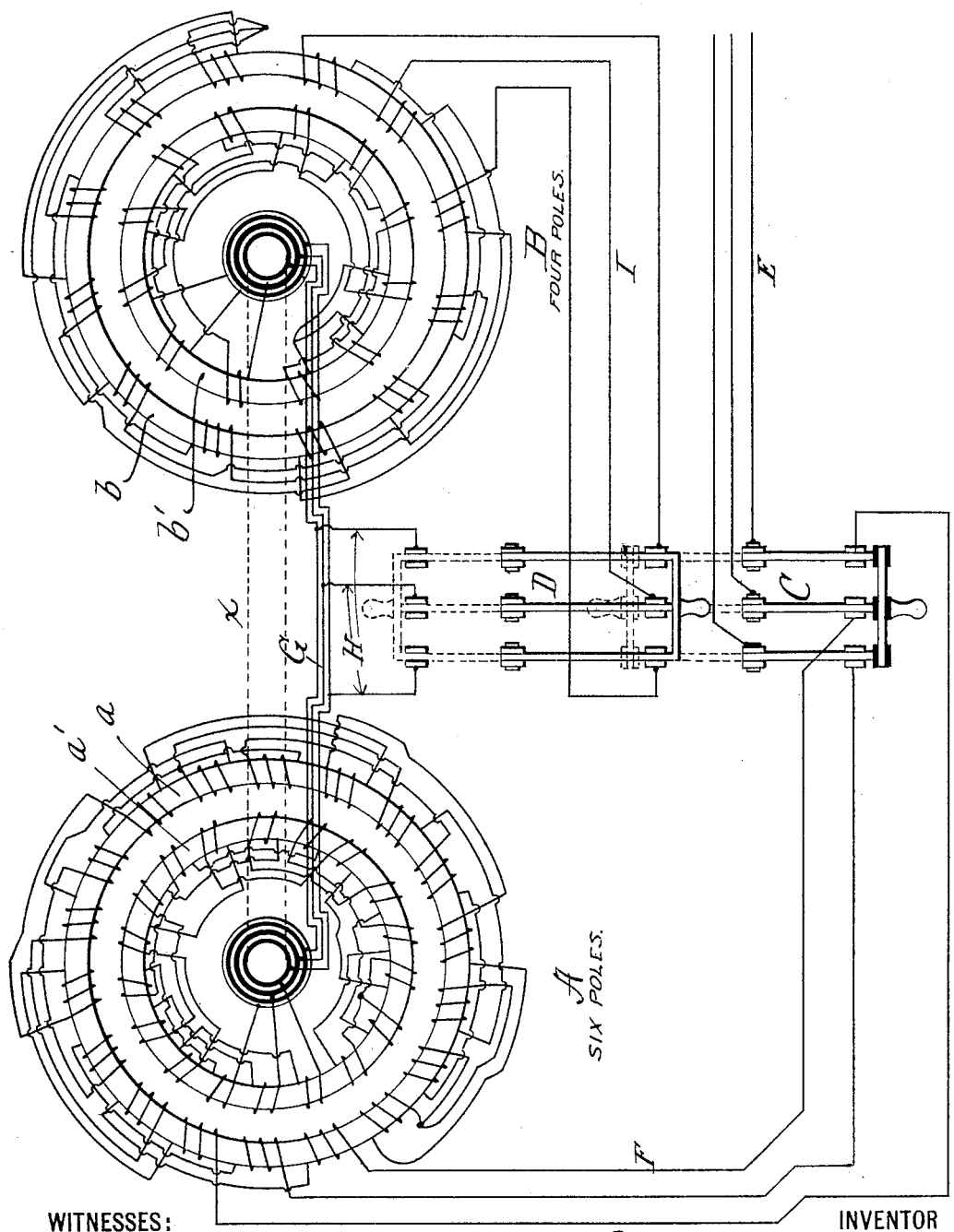
WITNESSES:
Harry Bailey
Frank S. Ober
INVENTOR
Ernst Danielson
BY
Wm. A. Rosenbaum
ATTORNEY

UNITED STATES PATENT OFFICE.

ERNST DANIELSON, OF STOCKHOLM, SWEDEN.

REGULATING SPEED OF INDUCTION-MOTORS.

SPECIFICATION forming part of Letters Patent No. 584,577, dated June 15, 1897.

Application filed May 2, 1896. Serial No. 589,932. (No model.)

*To all whom it may concern:*

Be it known that I, ERNST DANIELSON, a subject of the King of Sweden and Norway, residing at Stockholm, in the Kingdom of Sweden, have invented certain new and useful Improvements in Methods of Regulating the Speed of Polyphase Induction-Motors, of which the following is a full, clear, and exact description.

The object of my invention is to provide a simple method of controlling the speed of single and polyphased induction-motors by means of changes in the electrical connections between the motors, and also of the latter to the line.

It is well known that the so-called "synchronous" speed of an induction-motor is directly proportional to the frequency of the primary currents and inversely proportional to the number of poles in the primary circuit of the motor. The working speed tends toward synchronism, but never quite reaches it in practice, for at synchronism there are no secondary currents and no torque, the frequency of the secondary currents in any case being proportional to the difference between the actual and synchronous speeds. If, therefore, the secondary coils of one motor, instead of being short-circuited or connected through resistances, as is usual, are connected in series with the primaries of a second motor, the latter will tend to run in synchronism with the secondary currents of the first motor. The nearer synchronism the first motor runs the slower the second will run, and, conversely, the more the first motor slips the faster the second motor will run. If there is any mechanical tendency for the two motors to run at the same speed, as there is where they both drive the same car, or, more specially, if they are mechanically connected they will assume the speed which would be assumed by a single motor run in the ordinary manner and having as many poles as both the actual motors together. This will be the case whether the number of poles in the two machines is equal or not. This is technically known as "connecting in tandem."

The broad principle of connecting in tandem is not new, and I do not make any claim thereto, my invention consisting in the method of using the tandem principle. I use two or more motors having different numbers of poles—say, for instance, one of six poles and one of four poles connected to a main shaft or to the axles of a car. When these two motors are connected in tandem, they will run like a ten-pole motor, whichever is taken for the first motor. For instance, if the six-pole motor is connected to line it will revolve with six-tenths of its own synchronous speed and its secondary currents will therefore have four-tenths the primary frequency, which is right to make the four-pole motor run at the same speed—that is, the synchronous speed of a ten-pole motor. If the four-pole motor is connected to line, it will run at four-tenths of its own synchronous speed (which is the same as before) and its secondary currents will have six-tenths of the primary frequency which is right to run the six-pole motor at the same speed. This tandem connection furnishes the slowest speed, the motor with the greater number of poles when used alone in the ordinary manner gives a faster speed, and the motor with the lesser number of poles used alone gives the fastest speed.

Although when running full speed with a car only half of the motors are used, this does not mean a low-plant efficiency, on account of the fact that the heaviest service which car-motors have to perform is always at starting, and when starting all motors are used.

The accompanying drawing shows diagrammatically the required connections to produce the results described.

Let us assume that A is a six-poled motor, and B is a four-poled motor mechanically geared together, as indicated by the dotted line *x*. C is a three-poled double-throw switch for connecting the line-wires E to the primaries F and I of either A or B. D is a three-poled double-throw switch for short-circuiting the secondaries of either A or B.

In the positions of the switches shown by the full lines the currents from the line-wires E pass through the switch C to the wires F and so to the stator *a* of the motor A. The stator *a* consequently acts in this case as the primary of the motor A. The secondary currents which are generated in the rotor *a'* of the motor A in consequence of its non-synchronous rotation pass over the wires G to the rotor *b'* of the motor B. The rotor *b'* therefore acts in this case as the primary of the motor B. The secondary currents which are generated in the stator $b$ of the motor B pass over the wires I to the switch D, which, being of a single piece of metal, connects the three wires I together—that is, it short-circuits the secondary of B. B therefore in this position runs under the normal condition of a polyphased induction-motor. This is the tandem connection. The speed of B is determined, first, by the frequency of the secondary currents from A and, second, (owing to the mechanical necessity of A and B revolving at the same speed,) on the speed of A. The speed of A is determined by the frequency of the line-currents and the mechanical condition mentioned. The only way that all these conditions can be satisfied is for both A and B to take the speed of a ten-poled motor driven by the same line-currents. This gives the slowest speed. If now the switch D be thrown over to the position indicated by the dotted lines, the secondary currents from the rotor $a$ pass over the wires II and are short-circuited by D. The rotor of B is also short-circuited and the stator open-circuited, and it is thereby thrown out of service, A carrying the whole load. This gives the intermediate speed. Next, if the switch C be thrown to its second position (shown by the dotted lines) the line-currents pass over the wires I to the stator of the motor B, which then becomes the primary, and the rotor which is now the secondary remains short-circuited. The rotor of A is short-circuited and the stator open-circuited, and it is thereby thrown out of service, the load being now all on B. This gives the highest speed.

The motor A might have been the four-poled motor and B the six-poled motor without changing the principle, the only difference being that the second and third positions of the switches would be interchanged, the first position remaining the same.

I claim as my invention—

In combination, a number of induction-motors mechanically connected together, said motors having different numbers of poles, and means for operating them singly or in tandem groups, substantially as described.

In testimony whereof I subscribe my signature in presence of two witnesses.

ERNST DANIELSON.

Witnesses:
GUSTAF OTTO HOLMGREN,
MARTIN ELION FREDRIK WIRENUS.